Patented Aug. 18, 1936

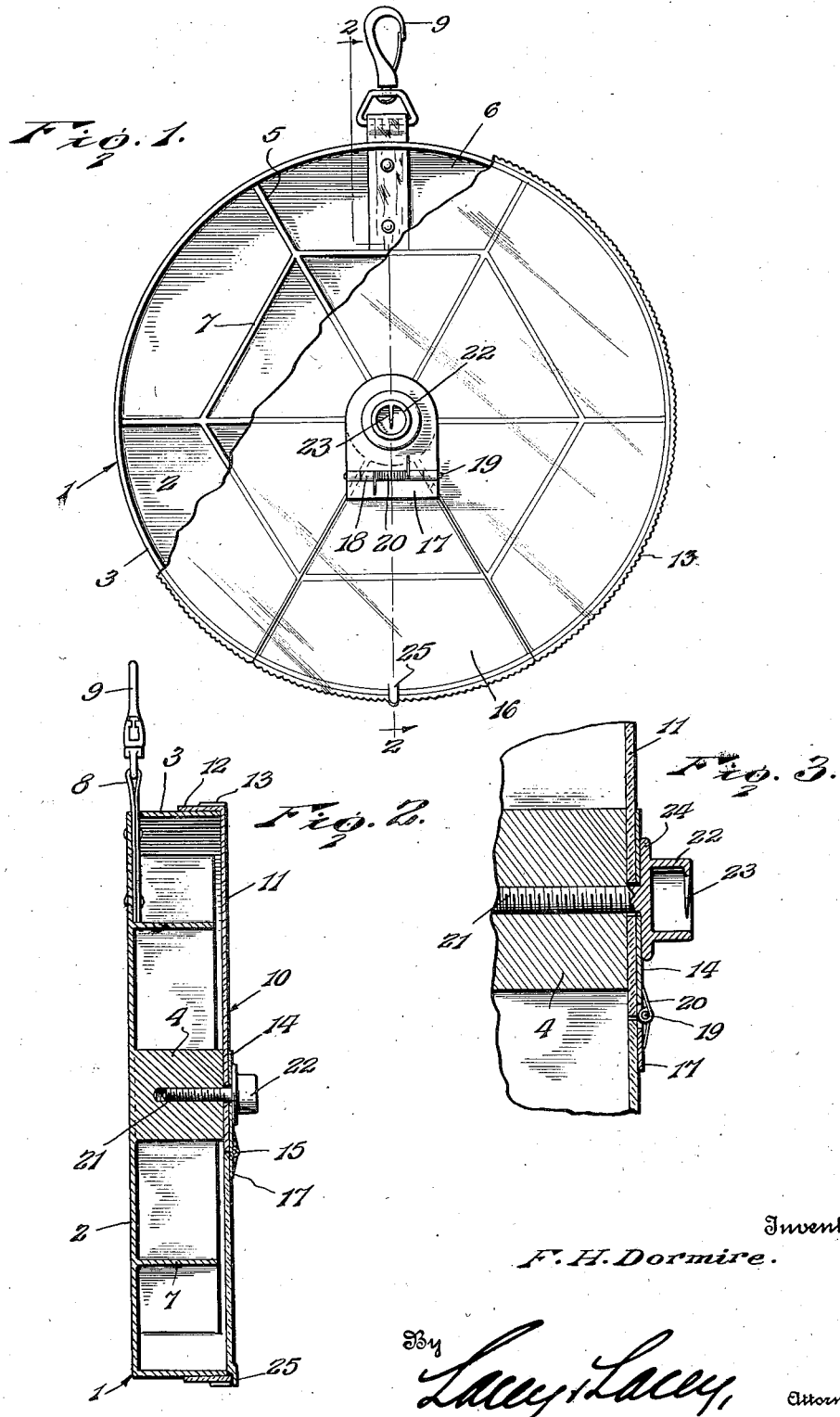

2,051,136

UNITED STATES PATENT OFFICE 2,051,136

BAIT BOX

Ford H. Dormire, Flint, Mich.

Application June 13, 1934, Serial No. 730,496

2 Claims. (Cl. 206—16)

The present invention relates to an improved bait box which is more particularly adapted for use by fishermen.

The invention seeks, among other objects, to provide a bait box wherein a number of compartments are formed and wherein means is employed for gaining access selectively to the compartments.

Another object of the invention is to provide a device of this character wherein the top and bottom sections are each pressed from a single piece of material.

A further object of the invention is to provide a bait box, the sections of which are secured in rotatable engagement by means of a bolt, which bolt is provided with a cup shaped head and a pin at its free end to permit ready cleaning of a fish hook eye.

Another object of the invention is to provide a bait box which may be readily secured to a fisherman's belt, the snap hook of a creel, or any other convenient location.

A further object of the invention is to provide a bait box having a top section including a segmental door or lid which is hingedly connected to said section so that it may be readily raised to permit the insertion of the fingers for removing bait and which, after the fingers have been removed, will snap back into closed position.

A further object of the invention is to provide a bait box having a transparent top section or cover which will permit the fisherman to observe the contents within the compartments so that selection of the proper fly may be made before opening the box.

And the invention has as a still further object to provide a bait box wherein access may be gained to one of the compartments without disturbing any of the other compartments.

Other and incidental objects of the invention not particularly mentioned in the foregoing will be apparent during the course of the following description.

In the drawing forming a part of this application:

Figure 1 is a top plan view of the device with the top thereof partly broken away to show the compartments.

Figure 2 is a sectional view taken on the line 2—2 of Figure 1, looking in the direction indicated by the arrows.

Figure 3 is an enlarged fragmentary detail sectional view showing more particularly the combined bolt and fish hook eye cleaner employed.

Referring now more particularly to the accompanying drawing, wherein like numerals of reference designate like parts throughout, the numeral 1 indicates in general the bottom section of my improved bait box, which is preferably formed from a single piece of suitable material such as heavy celluloid or a rubber composition. The bottom section is circular in outline and includes a bottom wall 2, a circular outer wall 3, and an integral relatively large hub 4. Extending radially from the hub and terminating at the outer wall are vanes or webs 5 which are formed integrally with the bottom section and define sector shaped compartments 6. The included angle between any two adjacent sides is the same so that the compartments are each of the same area. The compartments are adapted to receive bait, such as flies of different species, and, of course, different species may be placed in different compartments. Connecting the radial vanes or webs 5 and dividing each of the compartments into a pair of smaller compartments are connecting walls 7, which connecting walls, like the webs 5, are formed integrally with the bottom section and both said connecting walls and said webs are of a height slightly less than the height of the wall 3.

Carried on the upper face of the bottom wall of the bottom section and extending through the outer wall 3 at the junction of said wall with the bottom wall, is a loop 8 which is formed of elastic or other suitable material. Carried by the loop 8 is a snap hook 9 which is of conventional construction and is adapted for securing the device to a belt, the snap ring of a creel, or the like. Associated with the bottom section 1 of the bait box and rotatable thereon is an unbreakable circular top section 10 including a transparent top wall 11 which terminates in an integral circular flange 12 having a ribbed or serrated edge 13 throughout its circumference for permitting ready manual enagement. As will be noted, the flange 12 overlies the outer surface of the circular wall for a distance substantially equal to one-half the height of said circular wall. As best seen in Figure 2 of the drawing, the top section is normally positioned above the bottom section with the lower surface of the top wall 11 in abutting relation with the upper edges of the circular outer wall 3.

Mounted on the top wall 11 axially thereof is a hub plate 14 which is preferably formed of metal and is riveted or adhesively secured to the wall 11. As seen more clearly in Figures 2 and 3 of the drawing, the hub plate terminates in hinge loops 15. The top section is cut away to define a sector shaped opening, the edges of which are of a contour corresponding to the adjacent walls of any one of the compartments 6. Normally closing the sector shaped opening is a sector shaped door or lid 16 which is preferably formed of the material taken from the cut away portion. Mounted on the smaller end of said door is a hinge plate 17 having hinge loops 18 adapted to cooperate with the hinge loops 15. A hinge pin 19 serves to operatively connect the hub plate 14 with the hinge plate 17 so that the door will be hingedly connected with the top section. A spring 20 is wound about the pin 19 and cooperates with the plates 14 and 17 for normally urging the door to a closed position.

Rotatably connecting the top and bottom sections of my improved bait box is a bolt 21 which is provided at its outer end with a hollow cup shaped head 22 having an integral fish hook eye cleaning pin 23 extending throughout the major portion of the diameter of the head at its outer rim. The bolt 21 provides the only connection between the sections so that, by removing the bolt, the top section may be easily removed from the bottom section for cleaning. As the webs and connecting walls are slightly less in height than the wall 5, scraping of these walls on the under face of the top wall 11 will be prevented. The pin is adapted for permitting the cleaning of a fish hook eye. As better seen in Figure 3 of the drawing, the cup shaped head is provided with a relatively wide flange 24 which is adapted for engagement with the upper surface of the plate 14 for providing a relatively large bearing surface upon which the top section may rotate.

Formed on the door 16, intermediate its arcuate outer edge, is a finger lift 25 which will facilitate the raising of the door or lid.

In use, after flies of various types have been placed within the different compartments of the box, and it is desired to remove a certain one of these for use, the top section is first rotated about the hub until the lid 16 is disposed directly above the compartment to which access is to be gained. The door or lid 16 may then be raised and the fingers inserted for removing such bait as is desired. It is a particularly noticeable feature of the invention that while bait is being removed from one compartment the bait in the other compartments will not be disturbed and will be protected from the elements so that spoiling of the bait will be obviated. As the wall 11 of the top section is transparent, the fisherman may observe the contents of all the compartments and thus ascertain beforehand which of the bait he desires to remove. As soon as the fingers are removed from the compartment the lid will snap back into closed position and protect the bait in the compartment therebeneath.

When it is desired to clean a fish hook eye, the end of the pin 23 which is carried by the cup shaped head 22, is inserted therethrough for effecting the cleaning operation.

Attention is further called to the fact that the serrated edge 13 will permit ready manual engagement with the top section for permitting rotation thereof, so that danger of slipping of the device from the hands, particularly when wet, will be largely obviated.

As the lid 16 is formed of the material taken from the cut away portion of the upper section, the separate manufacture of a lid will not be necessary, so that cheapness in manufacture will be a keynote. Furthermore, as the device is formed of unbreakable material, it will stand hard usage.

It is believed that a reading of the foregoing description will disclose that I have provided a simple and highly efficient bait box.

Having thus described the invention, what I claim is:

1. A bait box including a bottom section having an integral hub, an outer wall and integral webs radially extending from said hub and defining compartments, a top section rotatably mounted on the bottom section and having a circular flange overlying the outer surface of the outer wall, a hub plate carried on the top section axially thereof and terminating at one end in hinge loops, said top section having a cut away portion, a door associated with the top section and normally closing the cut away portion, a hinge plate carried by the door, and a hinge pin connecting the hinge plate and hub plate for hingedly connecting the door to the top section, said door being shiftable for permitting access to be gained to a compartment thereunder.

2. A bait box including a bottom section having compartments, a top section rotatable thereon and having a cut away portion, a hub plate carried by the top section and terminating in hinge loops, a door normally closing the cut away portion, a hinge plate carried by the door and having hinge loops, a pin extending through the loops and hingedly connecting the door with the top section, a spring carried by the pin and adapted for retaining the door in closed position, and a bolt extending through the top section and into the bottom section axially thereof and being adapted for rotatably connecting the sections, said door being shiftable against the tension of the spring for permitting access to be gained selectively to the compartments when the top is rotated for disposing the door above a desired compartment.

FORD H. DORMIRE.